US012593281B2

(12) United States Patent
Zou et al.

(10) Patent No.: US 12,593,281 B2
(45) Date of Patent: Mar. 31, 2026

(54) WIRELESS DEVICE FOR POWER SAVING

(71) Applicant: Telefonaktiebolaget LM Ericsson (publ), Stockholm (SE)

(72) Inventors: Gang Zou, Lund (SE); Henrik Sjöland, Lund (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 351 days.

(21) Appl. No.: 17/624,720

(22) PCT Filed: Jul. 5, 2019

(86) PCT No.: PCT/EP2019/068075
§ 371 (c)(1),
(2) Date: Jan. 4, 2022

(87) PCT Pub. No.: WO2021/004600
PCT Pub. Date: Jan. 14, 2021

(65) Prior Publication Data
US 2022/0256468 A1 Aug. 11, 2022

(51) Int. Cl.
*H04W 52/02* (2009.01)
*H04W 52/52* (2009.01)
*H04W 56/00* (2009.01)

(52) U.S. Cl.
CPC ... *H04W 52/0274* (2013.01); *H04W 52/0229* (2013.01); *H04W 52/0245* (2013.01); *H04W 52/52* (2013.01)

(58) Field of Classification Search
CPC ...... H04W 76/20–28; H04W 88/00–06; Y02D 30/70
See application file for complete search history.

(56) References Cited

U.S. PATENT DOCUMENTS

| 8,391,349 | B1 * | 3/2013 | Khalili | .............. | H04L 25/03878 375/345 |
| 2007/0054642 | A1 * | 3/2007 | Bhardwaj | ................. | H04L 5/06 455/234.1 |

(Continued)

FOREIGN PATENT DOCUMENTS

| CN | 103688579 A | 3/2014 |
| CN | 106487525 A | 3/2017 |

(Continued)

OTHER PUBLICATIONS

International Search Report and the Written Opinion of the International Searching Authority, issued in corresponding International Application No. PCT/EP2019/068075, dated Mar. 9, 2020, 12 pages.

(Continued)

*Primary Examiner* — San Htun
(74) *Attorney, Agent, or Firm* — Rothwell, Figg, Ernst & Manbeck, P.C.

(57) ABSTRACT

A wireless device comprising at least one antenna is provided. The wireless devices further comprises a main receiver, having first automatic gain control circuitry for controlling a gain applied to signals received by way of the antenna. The wireless device further comprises an auxiliary receiver, configured to monitor a power of a periodic reference signal received by way of the antenna, and further configured to send power information to the main receiver. The main receiver is configured, on waking up, to use the power information received from the auxiliary receiver to assist in operation of the first automatic gain control circuitry.

17 Claims, 7 Drawing Sheets

(56) References Cited

U.S. PATENT DOCUMENTS

| | | | |
|---|---|---|---|
| 2013/0064151 A1* | 3/2013 | Mujtaba | H04L 43/0823 |
| | | | 370/311 |
| 2013/0176873 A1 | 7/2013 | Ji et al. | |
| 2014/0133606 A1* | 5/2014 | Mochizuki | H04W 52/0245 |
| | | | 375/340 |
| 2014/0169417 A1 | 6/2014 | Buescher et al. | |
| 2018/0098287 A1* | 4/2018 | Ang | H04W 52/0229 |
| 2018/0115952 A1* | 4/2018 | Shellhammer | H04W 64/003 |
| 2018/0152889 A1* | 5/2018 | Kim | H04W 52/0229 |
| 2018/0219587 A1* | 8/2018 | Huo | H04B 1/40 |
| 2018/0255515 A1 | 9/2018 | Gupta Hyde et al. | |
| 2018/0295578 A1* | 10/2018 | Liu | H04W 52/0229 |
| 2022/0264449 A1* | 8/2022 | Horn | H04W 52/0212 |

FOREIGN PATENT DOCUMENTS

| | | |
|---|---|---|
| CN | 106664664 A | 5/2017 |
| CN | 107112966 A | 8/2017 |

OTHER PUBLICATIONS

CATT "UE Power saving schemes and power saving signal/channel" 3GPP TSG RAN WG1 Meeting #96, R1-1902025, Athens, Greece, Feb. 25-Mar. 1, 2019, 25 pages.

CATT "Evaluation results of UE Power Saving Schemes" 3GPP TSG RAN WG1 Ad-Hoc Meeting 1901, R1-1901273, Taipei, Jan. 21-25, 2019, 14 pages.

Abdulaziz et al. "A Cellular Receiver Front-End with Blocker Sensing" 2016 IEEE Radio Frequency Integrated Circuits Symposium, pp. 238-241.

Fujii et al. "Feedforward and feedback AGC for fast fading channels" IEEE, Electronics Letters, Jun. 22, 1995, vol. 1, No. 13, pp. 1029-1030.

MediaTek Inc. "Considerations on NR RRM power saving with additional resource" 3GPP TSG RAN WG1 Meeting RAN1 #95, Spokane, U.S., Nov. 12-16, 2018, 8 pages.

* cited by examiner

WIRELESS DEVICE FOR POWER SAVING

CROSS REFERENCE TO RELATED APPLICATION(S)

This application is a 35 U.S.C. § 371 National Phase Entry Application from PCT/EP2019/068075, filed Jul. 5, 2019, designating the United States, the disclosure of which is incorporated herein by reference in its entirety.

TECHNICAL FIELD

This relates to a wireless device, and in particular to receiver circuitry in a wireless device.

BACKGROUND

In a wireless receiver, Automatic Gain Control (AGC) is often used, in order to ensure that the magnitude of received signals is adapted so that signal processing functions in the receiver operate optimally.

In the case of a User Equipment (UE) in a cellular communications network, the UE spends a part of the time in a sleep state, in order to extend its battery life, periodically waking up from the sleep state in order to receive and decode paging information. The UE must perform AGC on the basis of reference signals that it receives from the network, in order to be able to receive and decode the paging information. However, this may require the receiver to wake up from the sleep state in order to receive the reference signals, and perform AGC, and the receiver is then unable to resume the sleep state before it receives the paging information. In the case of existing proposals for the $5^{th}$ Generation New Radio, where the reference signals are not transmitted in every subframe, this means that the time that the UE is able to spend in the sleep state is shorter than it would otherwise be, and hence the UE's battery life is reduced.

One alternative proposed in the 3GPP document R1-1812363 is to broadcast from the network additional reference signals that the UE can use in tuning its AGC, but this reduces the energy efficiency on the network side.

SUMMARY

According to an aspect of the present invention, there is provided a wireless device comprising: at least one antenna; a main receiver, having first automatic gain control circuitry for controlling a gain applied to signals received by means of the antenna; and an auxiliary receiver, configured to monitor a power of a periodic reference signal received by means of the antenna, and further configured to send power information to the main receiver, wherein the main receiver is configured, on waking up, to use the power information received from the auxiliary receiver to assist in operation of the first automatic gain control circuitry.

The auxiliary receiver may have lower power consumption than the main receiver.

The wireless device may be a user equipment device configured to operate in a cellular communications network, and in this case the periodic reference signal may be a signal broadcast by the cellular communications network.

The auxiliary receiver may comprise a timer configured to allow the auxiliary receiver to detect the periodic reference signal.

The power information may comprise information indicating the power of the periodic reference signal.

The auxiliary receiver may comprise second automatic gain control circuitry, and the power information may then comprise information corresponding to a gain applied by the second automatic gain control circuitry.

The auxiliary receiver may further comprise a spectrum sensing circuit, configured for measuring a power of signals across a wider bandwidth than said periodic reference signal, and wherein said power information comprises information about the power of signals across the wider bandwidth than said periodic reference signal.

The main receiver may be configured to wake up for paging and/or measurement opportunities, and not to wake up when said periodic reference signal is broadcast.

The auxiliary receiver may further comprise a baseband processing circuit for extracting additional information from the signals received by means of the antenna, and the auxiliary receiver may be further configured to send the additional information to the main receiver. The baseband processing circuit may be configured for extracting additional information from the periodic reference signal, and/or from a part of the signals received by means of the antenna separate from the periodic reference signal.

This has the advantage that the main receiver does not need to be woken specifically to monitor the power of the periodic reference signal, and so the overall power consumption of the device can be reduced.

BRIEF DESCRIPTION OF THE DRAWINGS

For a better understanding of the disclosure, reference will now be made, by way of example only, to the accompanying drawings, in which:—

DETAILED DESCRIPTION

Figure 1:
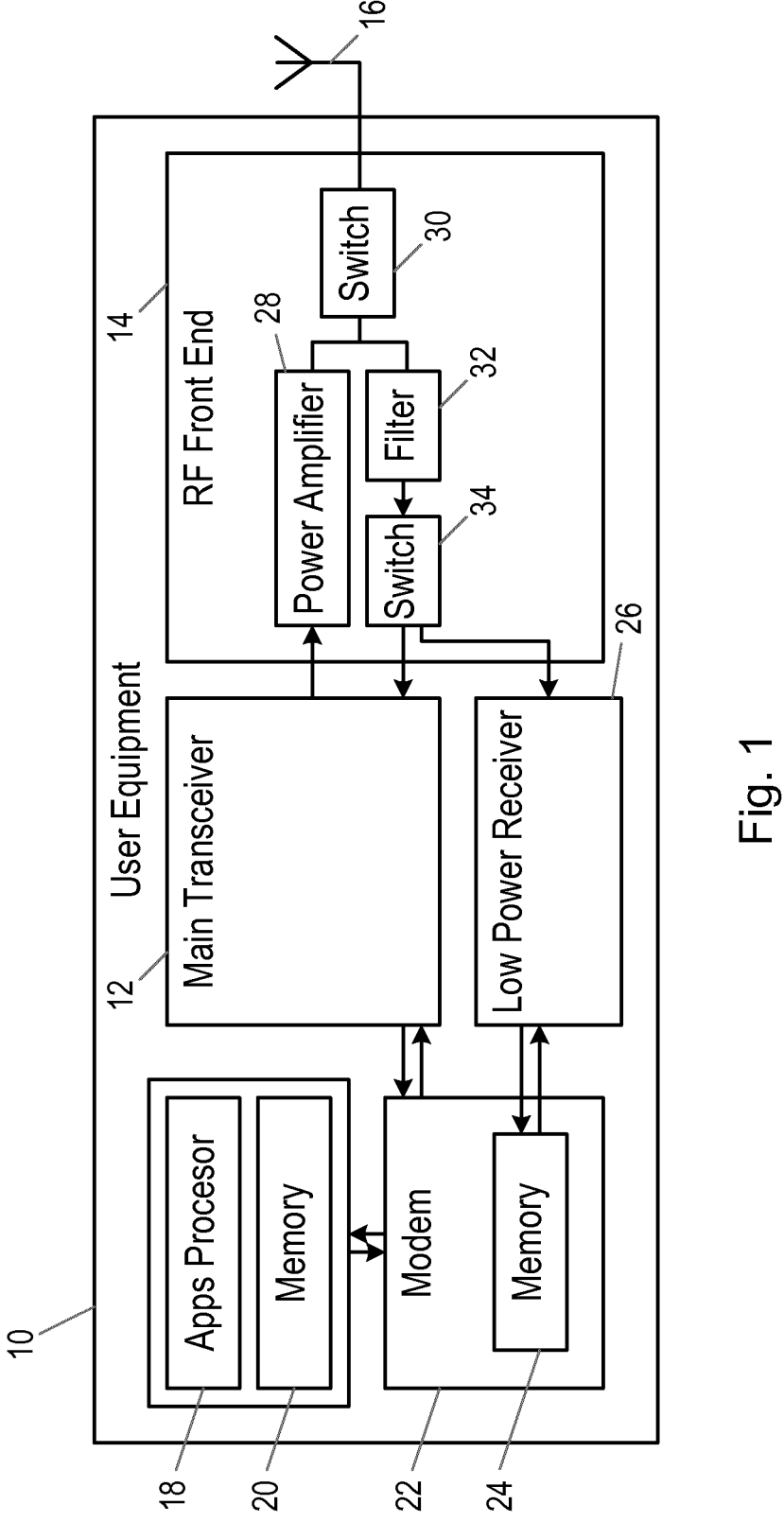
FIG. 1 is a block schematic diagram of a wireless device.

FIG. 1 illustrates a wireless device in accordance with the present disclosure. In this example, the wireless device takes the form of a User Equipment (UE) 10, which is configured for use in a cellular communications network. However, the wireless device may take the form of any device that is intended to receive wireless signals.

The UE includes one radio frequency (RF) transceiver 12, which is configured to transmit and receive cellular signals via RF front-end circuitry 14 and an antenna 16. This allows the UE to communicate with a radio access node, such as a base station (gNB) of the cellular network in a generally conventional way.

The UE 10 also includes an Applications Processor 18, configured for running the operating system and the applications software of the UE, and its associated memory 20. In addition, the UE 10 includes a baseband processor, or modem, 22 for cellular communication, and its associated memory 26.

In this embodiment, the UE 10 also includes an additional, or auxiliary, receiver 26, which will be described in more detail below. The auxiliary receiver 26 is designed to operate with lower power consumption than the main receiver circuitry in the transceiver 12. For example, this might be achieved by designing the auxiliary receiver 26 to have lower performance in some respects than the main receiver circuitry in the transceiver 12. More specifically, the auxiliary receiver 26 may operate over a narrower bandwidth, or may be able to tolerate more clock phase noise, thus making a lower power design possible, compared with the main receiver circuitry in the transceiver 12.

The auxiliary low power receiver 26 can be implemented in a separate silicon chip from the main transceiver 12 and the baseband circuitry 22, or in a separate die integrated into a single package with the main transceiver 12 and/or the baseband circuitry 22, or can be implemented as a part of the main transceiver 12 and/or the baseband circuitry 22.

The auxiliary low power receiver 26 is connected to the RF front-end circuitry 14, such that it can receive signals transmitted from the radio access node.

In this illustrated embodiment, the RF front-end circuitry 14 is configured to direct received signals to the main transceiver 12, or to the auxiliary receiver 26, as required. In other embodiments, received signals are directed both to the main transceiver 12 and to the auxiliary receiver 26, which can act on them as required.

Thus, in this illustrated embodiment, transmit signals generated by the main transceiver 12 are passed to a power amplifier 28, and then through a duplexer switch 30 to the antenna 16.

Signals received by the antenna 16 are passed through the duplexer switch 30 to a filter 32, and then to a second switch 34, which directs the received signals to the main transceiver 12 or to the auxiliary receiver 26, as required.

As described in more detail below, the auxiliary receiver 26 is configured to monitor a power of a periodic reference signal received by means of the antenna 16 while the receiver circuitry in the main transceiver 12 is in a sleep mode, and further configured to send power information to the receiver circuitry in the main transceiver 12. The main receiver is then configured, on waking up, to use the power information received from the auxiliary receiver to assist in operation of Automatic Gain Control circuitry.

Figure 2:
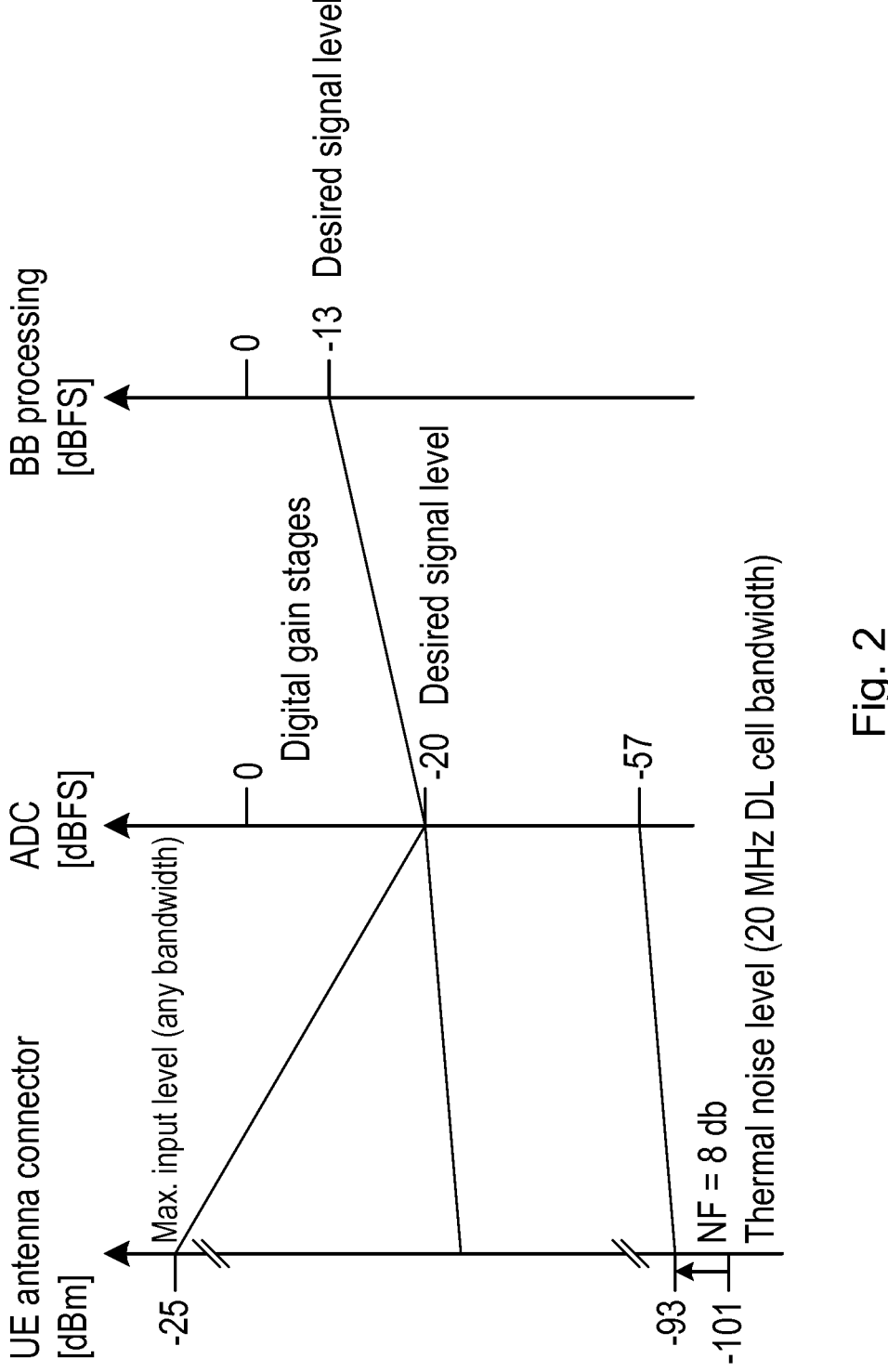
FIG. 2 illustrates an example of signal levels at stages of the wireless device.

FIG. 2 illustrates the operation of Automatic Gain Control (AGC) circuitry in the UE 10.

As shown in FIG. 2, a typical figure for the thermal noise level is −101 dBm, and the noise floor is 8 dB above this, i.e. at −93 dBm. The maximum signal level at the UE antenna connector is −25 dBm.

The function of the AGC circuitry is to control the analog gain stages of the receiver circuitry to map the possible range of signal levels at the UE antenna connector onto the dynamic range of analog-digital converters (ADCs) in the UE. As shown in FIG. 2, after analog-digital conversion, the signals are applied to digital gain stages before being passed to the baseband processor with a desired signal level.

The operation of the AGC circuitry is therefore important in order to make best use of the available ADC resolution, and the word lengths of the signal processing functions along the receiver chain. This allows the UE to include an ADC with lower resolution, and therefore reduces the required chip area, and hence the cost of the receiver circuitry in the UE, and also reduces the power consumption of the UE.

In order to save its battery life, much of the transceiver functionality of a UE may be in a deep sleep for significant periods of time, determined by the Radio Resource Control (RRC) software layer, for example during the RRC_IDLE and/or RRC_INACTIVE state. However, the transceiver functionality must still be activated periodically, in order to receive and decode paging information transmitted by the network, so that the network can inform the UE about incoming calls or data, and about changes in system information.

In order to receive and decode the paging information optimally, operation of the AGC circuitry of the UE is advantageous. This depends on the AGC circuitry having information about the power of the received signals, and so the AGC circuitry is typically tuned by receiving certain reference signals from the network. For example, in New Radio (NR), i.e. the radio interface part of the $5^{th}$ Generation cellular network, a Synchronization Signal Block (SSB) can be used as a reference signal for AGC tuning. However, in NR 3GPP Release 15, the SSB is not always transmitted at the same time as the occurrence of the paging occasions. In this situation, receiver circuitry of the UE must be woken in order to receive the SSB for the purposes of tuning the AGC.

Figure 3:
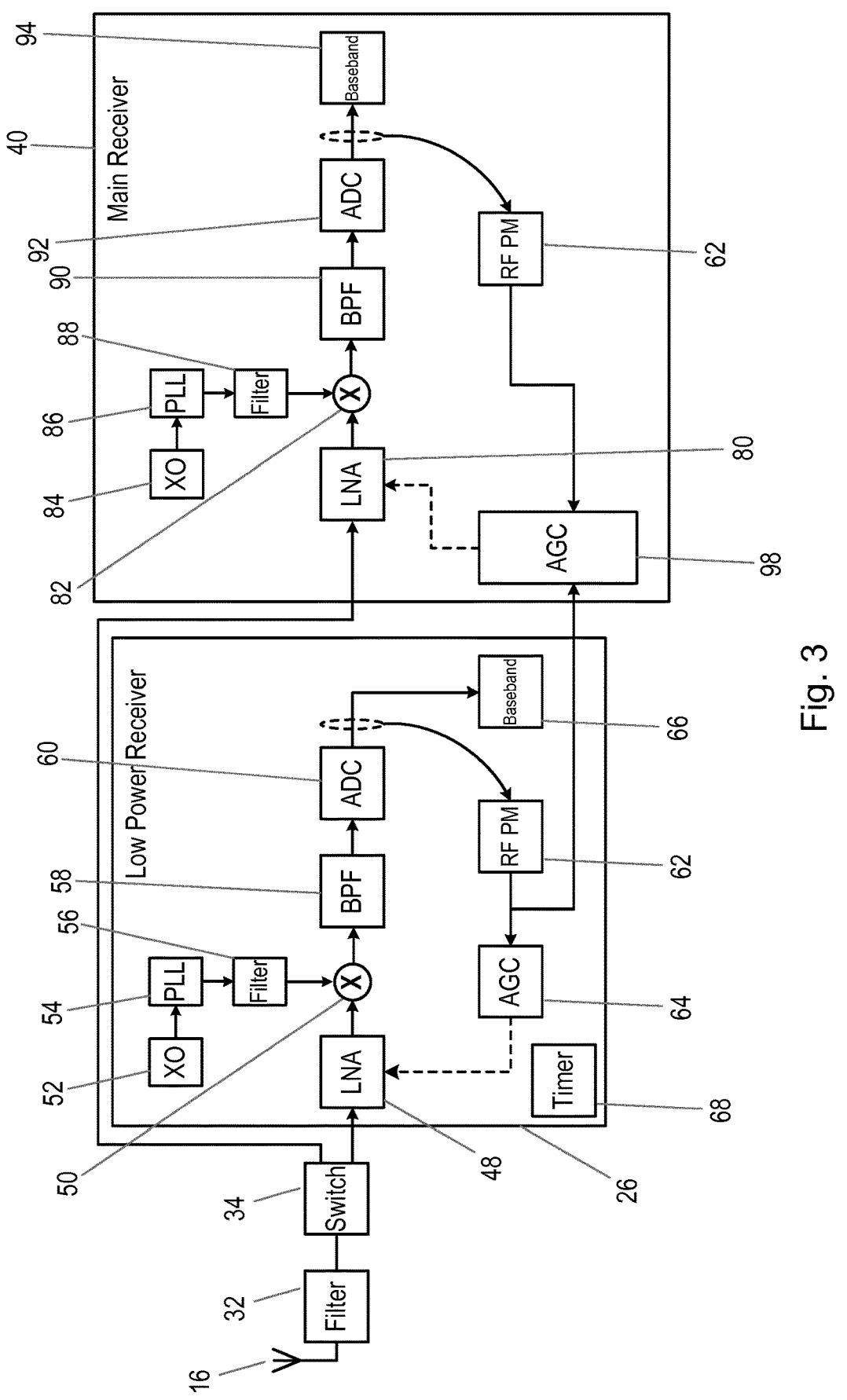
FIG. 3 is a block schematic diagram illustrating receiver circuitry in a wireless device.

FIG. 3 illustrates an embodiment, in which the auxiliary receiver 26 is configured to monitor a power of the periodic reference signal while the receiver circuitry in the main transceiver 12 is in a sleep mode, such that the main receiver can use power information obtained by the auxiliary receiver to assist in operation of its AGC circuitry.

Thus, FIG. 3 illustrates a part of the UE 10 of FIG. 1, showing the receiver circuitry in more detail.

Signals received by the antenna 16, which have passed through the duplexer switch 30 (not shown in FIG. 3) are passed to a filter 32, and then to a switch 34. The received signals are then passed to the low power receiver 26 and/or the main receiver circuitry 40 in the main transceiver 12.

Signals received by the low power receiver 26 are passed first to a Low Noise Amplifier (LNA) 48, and then to a mixer 50. The mixer 50 also receives a signal generated by a crystal oscillator (XO) 52, Phase-Locked Loop (PLL) 54, and a filter 56.

The received signals are downconverted in the mixer 50, and passed to a Band-Pass Filter (BPF) 58, and then to an Analog-Digital Converter (ADC) 60.

The output signal generated by the ADC 60 is monitored by a RF power measurement block (RF PM) 62, which calculates the power of the In-Phase and Quadrature (IQ) signals. The IQ signal power (i.e. $I^2+Q^2$, where I and Q are the respective magnitudes of the In-Phase and Quadrature signals) is fed to an AGC block 64. The AGC block 64 runs a suitable AGC algorithm in order to generate a gain value that can be applied to the LNA 48 in order to tune its gain. For example, the AGC algorithm can be implemented as a simple look-up table, in which the calculated IQ signal power leads to a specific gain value.

The output of the ADC 60 may also be applied to a baseband processor 66 for decoding. This allows information from the received signals to be used by the low power receiver 26. For example, information from the received signals may be used by the low power receiver 26 for the purposes of frequency synchronization. The information may be extracted from the reference signal that is used for the purposes of generating the power information, as described in more detail below, and/or may be extracted from a separate part of the received signals. For example, the baseband circuit 66 may be able to detect wakeup signals. In addition, the information extracted from the received signals may be transmitted to the main receiver, for use by the main receiver.

In addition, the low power receiver circuitry 26 may include a timer 68. The timer 68 synchronizes the operation of the low power receiver circuitry 26 so that it knows when to detect the signals of interest. As mentioned above, in one embodiment, the timer 68 synchronizes the operation of the low power receiver circuitry 26 such that it monitors the power of a periodic reference signal, for example the Synchronization Signal Block (SSB), and performs the AGC operation on the basis of that monitored power.

Similarly, signals received by the main receiver 40 are passed first to a Low Noise Amplifier (LNA) 80, and then to a mixer 82. The mixer 82 also receives a signal generated by a crystal oscillator (XO) 84, Phase-Locked Loop (PLL) 86, and a filter 88.

The received signals are downconverted in the mixer 82, and passed to a Band-Pass Filter (BPF) 90, and then to an Analog-Digital Converter (ADC) 92.

The output of the ADC 92 is passed to a baseband processor 94 for decoding and processing in a conventional way.

In addition, the output signal generated by the ADC 92 is monitored by a RF power measurement block (RF PM) 96, which calculates the power of the In-Phase and Quadrature (IQ) signals. The IQ signal power (i.e. $I^2+Q^2$, where I and Q are the respective magnitudes of the In-Phase and Quadrature signals) is fed to an AGC block 98. The AGC block 98 runs a suitable AGC algorithm in order to generate a gain value that can be applied to the LNA 80 in order to tune its gain. For example, the AGC algorithm can be implemented as a simple look-up table, in which the calculated IQ signal power leads to a specific gain value.

As mentioned above, the low power receiver 26 is configured to monitor the received power of a narrow band reference signal broadcast from network, during periods when the main receiver 40 is asleep.

As shown in FIG. 3, power information comprising information indicating the power of the received reference signal is sent to the main receiver 40, where it can be used by the AGC block 98. Then, when the main receiver wakes up, for example for receiving paging signals and/or for making neighbouring cell measurements, the AGC algorithm run by the AGC block 98 can use the reference signal power measured by the low-power receiver 26 as an input to accelerate the speed of convergence of the AGC algorithm.

For example, the power information can be sent directly from the low power receiver 26 to the main receiver 40, or the power information can be stored by the low power receiver 26 in memory (for example the memory 24 in the baseband processor 22 as shown in FIG. 1, or memory in the low power receiver itself) that is accessible by the main receiver 40.

Figure 4:
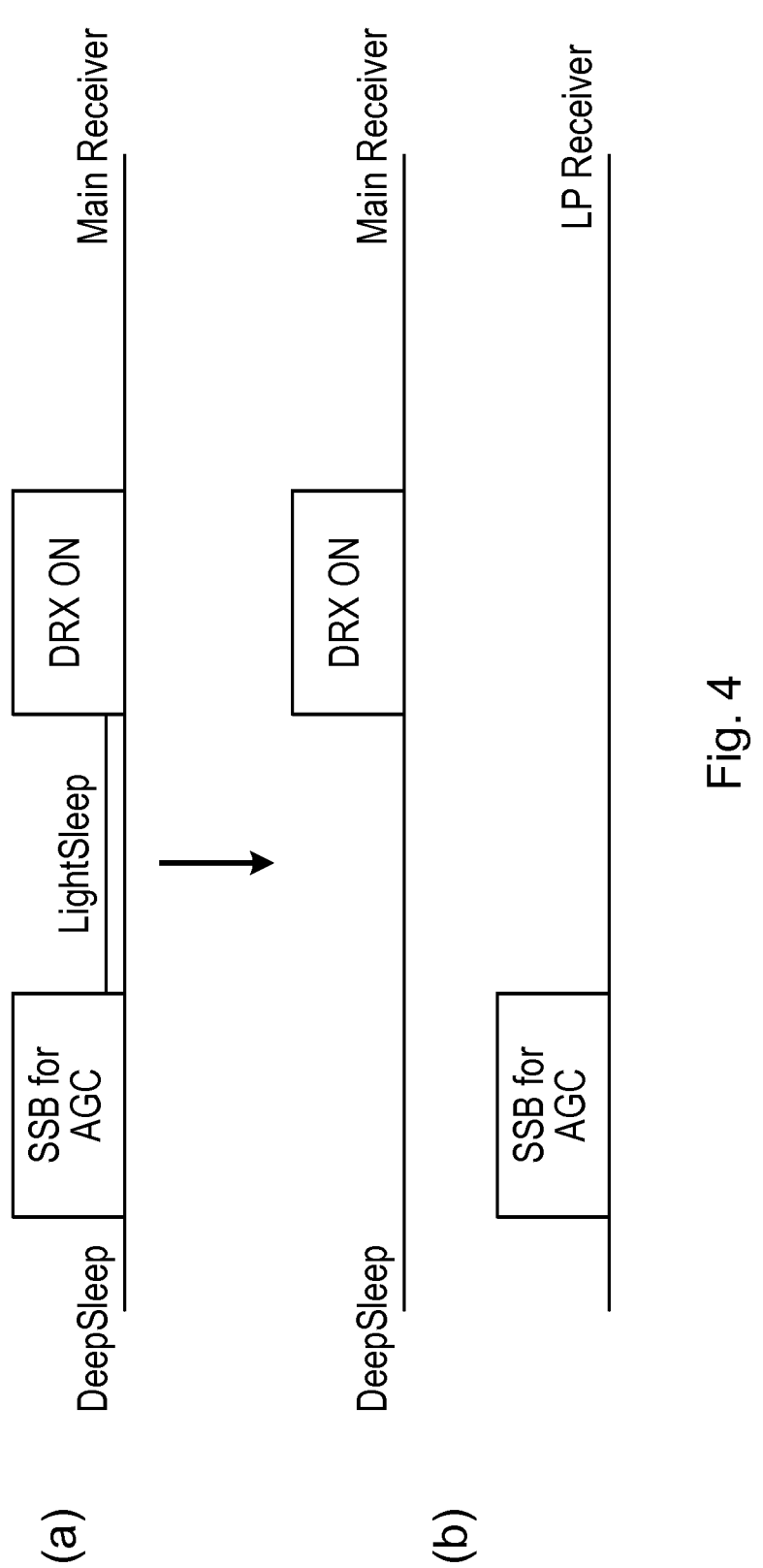
FIG. 4 illustrates operation of the receiver circuitry of FIG. 3.

FIG. 4 illustrates the operation of the AGC circuitry.

Specifically, FIG. 4(a) shows the situation in which a UE has only a single receiver. When the receiver is in a deep sleep, it must be woken to receive and decode the Synchronization Signal Block (SSB), in order to perform the AGC operation. The receiver can then enter a light sleep until the occurrence of a Discontinuous Reception (DRX) period, when the receiver must wake up, for example to receive a paging signal.

However, this means that the receiver has a significant power consumption for the period between the SSB and the DRX period.

FIG. 4(b) shows the situation in a UE such as that shown in FIG. 3, which has a main receiver and an auxiliary receiver. The main receiver does not need to monitor the Synchronization Signal Block (SSB), and therefore does not need to be woken to receive and decode the SSB. Rather, the low power auxiliary receiver receives the SSB, and performs the AGC operation on the basis thereof. The main receiver can therefore remain in a deep sleep until the occurrence of the Discontinuous Reception (DRX) period, when the main receiver must wake up, for example to receive a paging signal. At that time, the AGC circuitry in the main receiver can use the power information received from the auxiliary receiver in order to improve (i.e. accelerate) its convergence rate, and can then perform the required operations based on the signals that it receives. Thus, the UE has a significantly reduced overall receiver power consumption.

Figure 5:
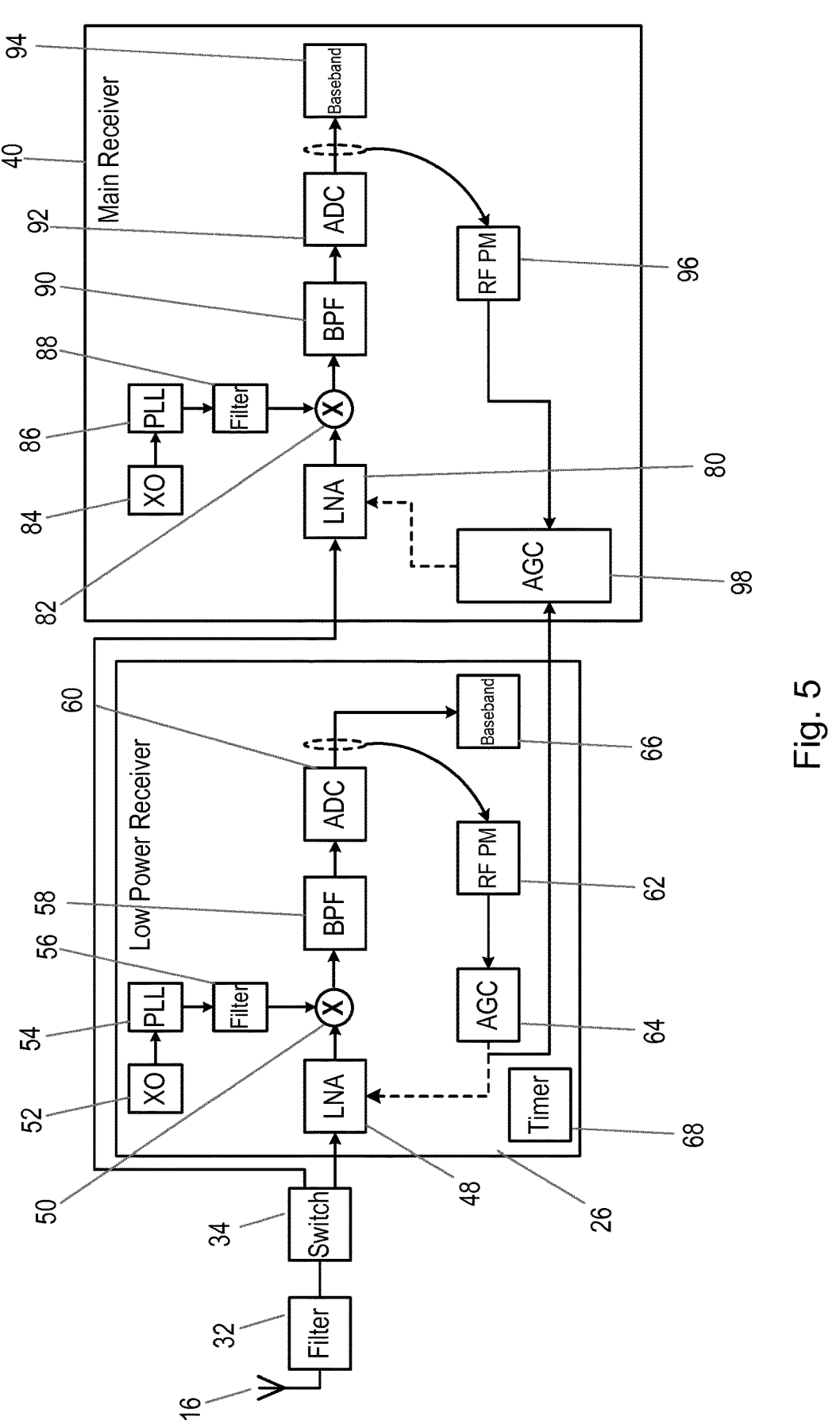
FIG. 5 is a block schematic diagram illustrating alternative receiver circuitry in a wireless device.

FIG. 5 shows an alternative embodiment, which generally corresponds to the embodiment shown in FIG. 3, and reference numerals used in FIG. 5 refer to features indicated by the same reference numerals in FIG. 3.

Again, in the embodiment shown in FIG. 5, power information, based on the monitored power of the periodic reference signal, is sent to the main receiver. In this embodiment, in which the auxiliary receiver 26 comprises automatic gain control circuitry 64, the power information comprises information corresponding to a gain value that is applied by the automatic gain control circuitry 64 to the LNA 48 of the auxiliary receiver 26.

As described with reference to FIG. 3, the power information derived from the received reference signal is sent to the main receiver 40, where it can be used by the AGC block 98. Then, when the main receiver wakes up, for example for receiving paging signals and/or for making neighbouring cell measurements, the AGC algorithm run by the AGC block 98 can use the AGC gain value calculated in the low-power receiver 26 as an input to accelerate the speed of convergence of the AGC algorithm.

Again as described with reference to FIG. 3, the power information can be sent directly from the low power receiver 26 to the main receiver 40, or the power information can be stored by the low power receiver 26 in memory (for example the memory 24 in the baseband processor 22 as shown in FIG. 1, or memory in the low power receiver itself) that is accessible by the main receiver 40.

Figure 6:
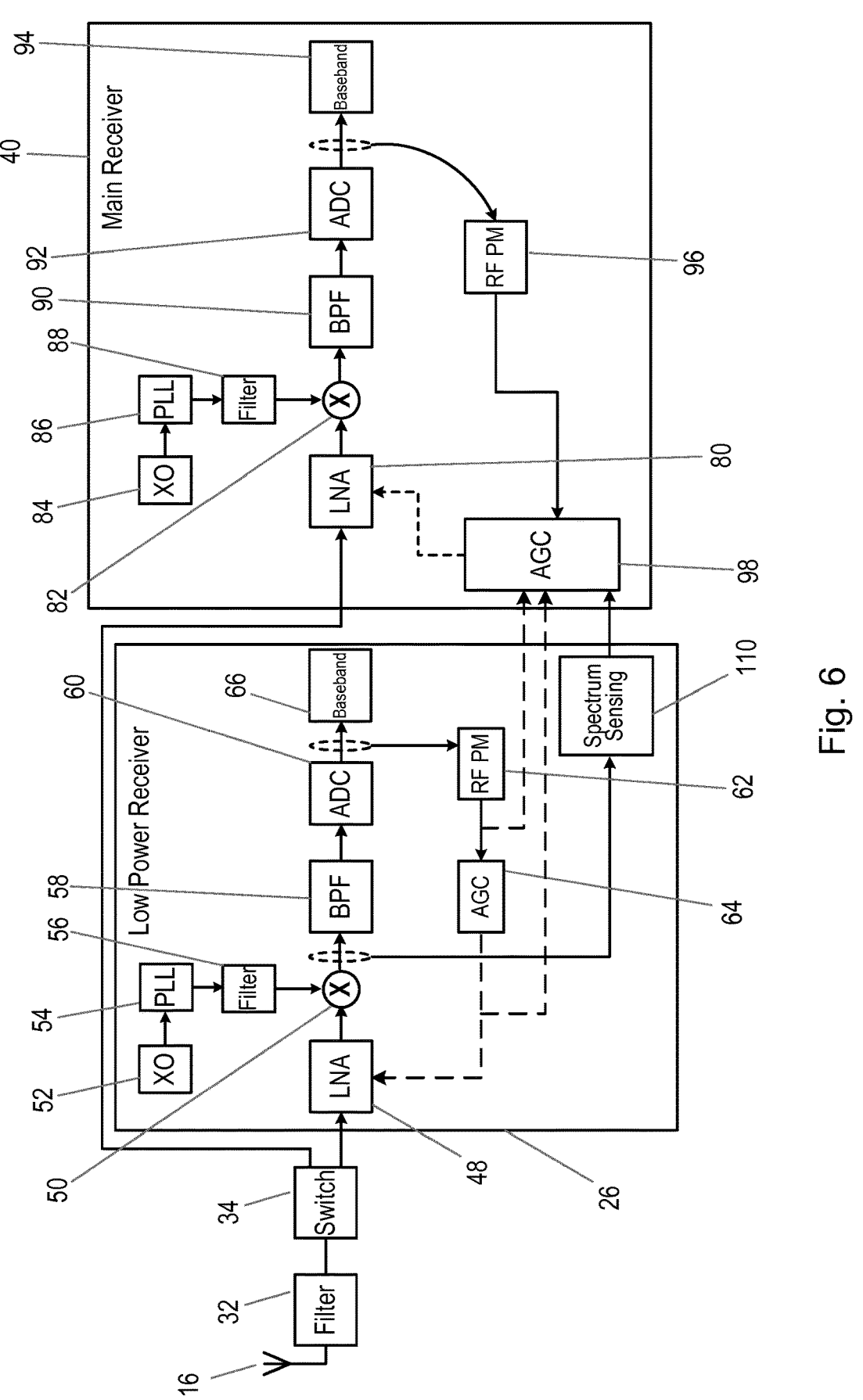
FIG. 6 is a block schematic diagram illustrating further alternative receiver circuitry in a wireless device.

FIG. 6 shows a further alternative embodiment, which generally corresponds to the embodiment shown in FIG. 3, and reference numerals used in FIG. 6 refer to features indicated by the same reference numerals in FIG. 3.

In the further alternative embodiment of FIG. 6, additional information is sent from the auxiliary receiver 26 to the main receiver 40.

As shown by the dashed lines, the power information that is sent from the auxiliary receiver 26 to the main receiver 40 may comprise information indicating the power of the periodic reference signal, generated by the RF PM block 62, as described with reference to FIG. 3, or may comprise information corresponding to a gain applied by the automatic gain control circuitry 64, as described with reference to FIG. 5.

In addition, a spectrum sensing circuit 110 is provided in the low power receiver 26. The spectrum sensing circuit 110 measures the power of the received signal across a relatively wide frequency range.

Figure 7:
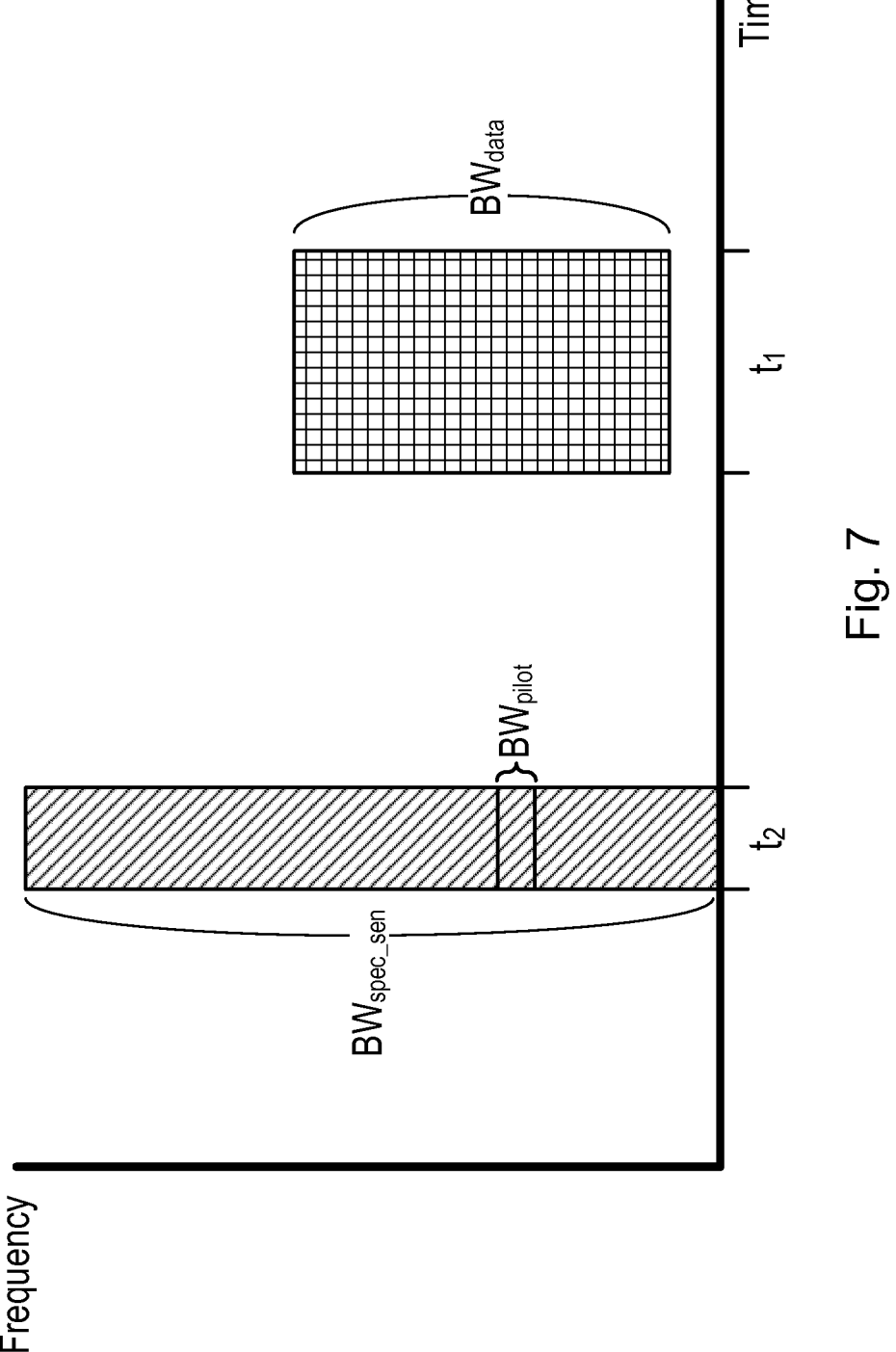
FIG. 7 illustrates operation of the receiver circuitry of FIG. 6.

FIG. 7 illustrates the operation of the spectrum sensing circuit 110. Specifically, FIG. 7 illustrates the signals transmitted over a range of times and frequencies. During a time period $t_1$ in each frame, the main data carrier signal is transmitted, and this has a bandwidth $BW_{data}$. During a time period $t_2$ in each frame, the reference or pilot, signal is transmitted, and this has a bandwidth $BW_{pilot}$.

In this embodiment, the spectrum sensing circuit 110 is configured to scan a frequency range $BW_{spec\_sen}$ during the time period $t_2$ in each frame, where the frequency range $BW_{spec\_sen}$ is much wider than $BW_{pilot}$ or even $BW_{data}$.

The spectrum sensing circuit 110 measures the RF power in each of a corresponding sub-ranges of the frequency range $BW_{spec\_sen}$, and the corresponding frequency, for example expressed as a frequency offset from the carrier, where the carrier is a specific frequency in the bandwidth $BW_{data}$. The measured power values are then digitized by a low speed ADC and stored in a memory which can be accessed by the main receiver. This information can be sent to the main receiver 40 one of the ways described for sending the power information. This information can then be used by the AGC block 98 in the main receiver 40 to determine possible sources of interference, allowing the gain control provided by the AGC block 98 to be further optimized, and allowing the AGC convergence rate to be further increased.

There is therefore described a wireless device in which power consumption can be reduced, and therefore battery life can be extended, by using an auxiliary receiver to provide power information to AGC circuitry of the main receiver.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A wireless device comprising:
 at least one antenna;
 a main receiver, having first automatic gain control circuitry for controlling a gain applied to signals received via said at least one antenna; and
 an auxiliary receiver comprising second automatic gain control circuitry, and
the auxiliary receiver is configured to:
 receive a Synchronization Signal Block (SSB);
 responsive to receiving the SSB, generate power information while the main receiver is in a DeepSleep mode, wherein the power information comprises a gain value applied by the second automatic gain control circuitry;
 calculate a power of a periodic reference signal received via said at least one antenna; and
 send the generated power information to the main receiver,
wherein the main receiver is configured to:
 receive the generated power information from the auxiliary receiver;
 responsive to receiving the generated power information, wake up from the DeepSleep mode; and
 based on the power of the periodic reference signal, perform an automatic gain control operation using the first automatic gain control circuitry,
wherein the DeepSleep mode is a power saving mode where the main receiver cannot at least receive and decode the SSB.

2. The wireless device according to claim 1, wherein the auxiliary receiver has lower power consumption than the main receiver.

3. The wireless device according to claim 1, wherein the wireless device is a user equipment device configured to operate in a cellular communications network.

4. The wireless device according to claim 3, wherein the periodic reference signal is a signal broadcast by the cellular communications network.

5. The wireless device according to claim 1, wherein the auxiliary receiver comprises a timer configured to allow the auxiliary receiver to detect the periodic reference signal.

6. The wireless device according to claim 1, wherein the auxiliary receiver further comprises a spectrum sensing circuit, configured for measuring a power of signals across a wider bandwidth than said periodic reference signal.

7. The wireless device according to claim 1, wherein the main receiver is configured to wake up for paging and/or measurement opportunities, and not to wake up when said periodic reference signal is broadcast.

8. The wireless device according to claim 1, wherein the auxiliary receiver further comprises a baseband processing circuit for extracting additional information from the signals received via said at least one antenna, and wherein the auxiliary receiver is further configured to send the additional information to the main receiver.

9. The wireless device according to claim 8, wherein the baseband processing circuit is configured to extract the additional information from the periodic reference signal.

10. The wireless device according to claim 1, wherein, while performing the automatic gain control operation using the first automatic gain control circuitry, the power of the periodic reference signal calculated by the auxiliary receiver is used to accelerate a speed of convergence of an automatic gain control algorithm run by the first automatic gain control circuitry.

11. The wireless device according to claim 1, wherein
 the auxiliary receiver comprises a radio frequency, RF, power measurement unit,
 power information indicating the power of the periodic reference signal is generated and outputted by the RF power measurement unit, and
 the power information is sent from the RF power measurement unit in the auxiliary receiver to the first automatic gain control circuitry in the main receiver.

12. The wireless device according to claim 11, wherein the power information generated and outputted by the RF power measurement unit is sent from the RF power measurement unit in the auxiliary receiver to the second automatic gain control circuitry in the auxiliary receiver.

13. The wireless device according to claim 1, wherein the auxiliary receiver is configured to:
 calculate the power of a periodic reference signal received via said at least one antenna; and
 based on the calculated power of the periodic reference signal, perform, using the second automatic gain control circuitry, an automatic gain control operation to generate a gain value associated with the calculated power of the periodic reference signal; and
 wherein the automatic gain control operation is performed using the first automatic gain control circuitry based on the gain value.

14. The wireless device according to claim 1, wherein, while performing the automatic gain control operation using the first automatic gain control circuitry, the gain is used to accelerate a speed of convergence of an automatic gain control algorithm run by the first automatic gain control circuitry.

15. The wireless device according to claim 1, wherein the auxiliary receiver comprises a radio frequency, RF, power measurement unit, the power of the periodic reference signal is calculated and outputted by the RF power measurement unit, and the power of the periodic reference signal is sent from the RF power measurement unit in the auxiliary receiver to the second automatic gain control circuitry in the auxiliary receiver.

16. The wireless device according to claim 15, wherein the power of the periodic reference signal is sent from the RF power measurement unit in the auxiliary receiver to the first automatic gain control circuitry in the main receiver.

17. A method performed by a wireless device, the wireless device comprising at least one antenna, a main receiver having first automatic gain control circuitry for controlling a gain applied to signals received via said at least one antenna, and an auxiliary receiver comprising second automatic gain control circuitry, the method comprising:

the auxiliary receiver, receiving a Synchronization Signal Block (SSB);

responsive to receiving the SSB, the auxiliary receiver, generating power information while the main receiver is in a DeepSleep mode, wherein the power information comprises a gain value applied by the second automatic gain control circuitry;

calculating, using the auxiliary receiver, a power of a periodic reference signal received via said at least one antenna;

the auxiliary receiver, sending the generated power information to the main receiver;

the main receiver, receiving the generated power information from the auxiliary receiver;

responsive to receiving the generated power information, the main receiver, waking up from the DeepSleep mode; and based on the power of the periodic reference signal, performing, by the main receiver, an automatic gain control operation using the first automatic gain control circuitry, wherein the DeepSleep mode is a power saving mode where the main receiver cannot at least receive and decode the SSB.

* * * * *